(12) United States Patent
Asai et al.

(10) Patent No.: US 8,752,056 B2
(45) Date of Patent: Jun. 10, 2014

(54) RUNNING NATIVE CODE ACROSS SINGLE OR MULTI-CORE HYBRID PROCESSOR ACHITECTURE

(75) Inventors: Nobuhiro Asai, Sakurashinmachi (JP); Rajesh R. Bordawekar, Yorktown Heights, NY (US); Ravi Shah, Laveen, AZ (US); Hayato Uenohara, Shinozake-machi (JP)

(73) Assignee: International Business Machines Corporation, Armonk, NY (US)

( * ) Notice: Subject to any disclaimer, the term of this patent is extended or adjusted under 35 U.S.C. 154(b) by 1100 days.

(21) Appl. No.: 11/949,139

(22) Filed: Dec. 3, 2007

(65) Prior Publication Data
US 2009/0144528 A1  Jun. 4, 2009

(51) Int. Cl.
*G06F 9/46* (2006.01)
(52) U.S. Cl.
USPC .......................... 718/102; 718/106; 718/108
(58) Field of Classification Search
None
See application file for complete search history.

(56) References Cited

U.S. PATENT DOCUMENTS

| | | | |
|---|---|---|---|
| 5,933,642 A * | 8/1999 | Greenbaum et al. | 717/140 |
| 7,127,709 B2 | 10/2006 | Demsey et al. | |
| 7,134,007 B2 | 11/2006 | Zimmer et al. | |
| 7,823,140 B2 * | 10/2010 | Chung | 717/148 |
| 2003/0084432 A1 | 5/2003 | Kobayashi | |
| 2004/0083467 A1 | 4/2004 | Hanley et al. | |
| 2005/0015781 A1 | 1/2005 | Brown et al. | |
| 2005/0240907 A1 | 10/2005 | Renouf | |
| 2006/0184920 A1 | 8/2006 | Wang et al. | |
| 2007/0006184 A1 | 1/2007 | Andrews et al. | |
| 2007/0094482 A1 | 4/2007 | Jensen et al. | |

OTHER PUBLICATIONS

El-Kharashi et al., "A Design Analysis of Java Processors," 0-7803-7978-0, IEEE, 2003, pp. 159-163.

* cited by examiner

*Primary Examiner* — Mengyao Zhe
*Assistant Examiner* — Wissam Rashid
(74) *Attorney, Agent, or Firm* — John D. Flynn; Gregory K. Goshorn; Greg Goshorn, P.C.

(57) ABSTRACT

Provided is a method that enables an interpretive engine to execute in a non-homogeneous, multiple processor architecture. Am interpretive engine is modified to identify code native to a target processor that is executing an ISA different than the ISA of the processor executing the interpretive engine. An intermediate function is called to correlate the native code with a processor type and a target processor is identified. A context is created for the native code and the context is either transmitted to the target processor or stored in a memory location such that the target processor may retrieve the context. Once the context is transmitted, the target processor executes the task. Results are either transmitted to the originating processor or placed in memory such that the originating processor can access the result and the originating processor is signaled of the completion of the task.

20 Claims, 6 Drawing Sheets

RUNNING NATIVE CODE ACROSS SINGLE OR MULTI-CORE HYBRID PROCESSOR ACHITECTURE

BACKGROUND

1. Technical Field

The claimed subject matter relates generally to computer processing and, more specifically, to a method for enabling a JAVA® Virtual Machine (JVM) to execute on a multi-core processor architecture with multiple non-homogeneous, or non-similar Instruction Set Architecture (ISA), cores.

2. Description of the Related Art

International Business Machines Corp. (IBM) of Armonk, N.Y. has been at the forefront of new paradigms in computing. For example, IBM has developed novel approaches in the technology of multiple processor architectures. For years, computers included a single processor and tasks assigned to the computer were all executed on the single processor. Over time, methods were developed to off-load particular portions of a task to other devices, enabling the single processor to execute the overall task more efficiently. One early example of this was the implementation of direct memory access (DMA) in which tasks associated with the fetching and storing of information are performed by computing logic associated with the memory rather than by the processor. In this manner, a processor can continue to execute a task while data from storage is either fetched or stored, which typically takes relatively longer than many other processing tasks.

IBM has also developed novel technologies in the field of multi-processor architecture. For example, in a multi-user system, different users may be assigned to different processors. Another example, in image processing, involves the splitting of a particular image into multiple, smaller images and processing the smaller images on different processors. Another example is a "pipe-line" architecture in which a first processor executes a first task of a job and then passes the result to a second processor to execute a second task. While the second processor is executing the second task, the first processor executes the first task on another part of the job. Of course, a pipe-line architecture may employ more than two processors.

Another development in the art of computer processing is the advent of interpretive engines such as the JAVA® Virtual Machine (JVM). JVM takes instructions written in a high-level language such as JAVA® and transforms those instructions into byte codes, which are then converted into processor specific executable code, or native code. Current multiple processor systems are configured with processors running the same Instruction Set Architecture (ISA) so that a single JVM may assign native code to any processor or, in the case of different processors executing different ISAs, each processor executes its own JVM specifically tailored to the processor's ISA and corresponding native code.

Currently, there is no system in which a JVM, or other type of interpretive engine, may execute on one processor and transparently assign native code tasks to a different processor that executes a different ISA than the processor running the JVM. With the advent of non-homogeneous, multi-processor systems, this has become a serious issue.

SUMMARY OF THE CLAIMED SUBJECT MATTER

Provided is a method that enables an interpretive engine, such as but not limited to a JAVA® Virtual Machine (JVM), to execute on a multi-core processor architecture with multiple non-homogeneous, or non-similar Instruction Set Architecture (ISA), cores. A typical JVM is configured to take advantage of multiple processors only when each processor, or core, is executing the same ISA. In the disclosed subject matter, a JVM is modified to dispatch JAVA® native code, called through JAVA® Native Interface (JNI), to different processor cores, irrespective of the differences between ISAs of various cores. In the alternative, particular tasks are compiled into native code to execute on different ISAs based upon performance or other criteria such that, when the particular task corresponding to a particular native code is identified, the JVM transmits the native code to the appropriate processor to perform the task.

Once identified, an intermediate function is called that correlates the native code with a processor type and identifies a target processor. A context is created for the native code and the native code and the context are transmitted to the target processor. A context typically includes any data necessary for execution of the native code formatted to meet the requirements of the target processor and the ISA of the target processor. The native code and the context may be either transmitted to the target processor or stored in a memory location such that the target processor can retrieve the native code and the context.

Once the target processor is identified and the context is created and made available, the target processor executes the task represented by the native code. Results are either transmitted to the originating processor or placed in a memory location that the originating processor can access and the originating processor is signaled of the completion of the task. While the target processor is executing the task, the originating processor may either wait for the result or continue with the processing of other tasks.

This summary is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed description.

BRIEF DESCRIPTION OF THE FIGURES

A better understanding of the claimed subject matter can be obtained when the following detailed description of the disclosed embodiments is considered in conjunction with the following figures.

DETAILED DESCRIPTION OF THE FIGURES

Although described with particular reference to a JAVA® Virtual Machine (JVM), the claimed subject matter can be implemented in conjunction with any interpretive engine in which access to multiple, non-homogeneous processors is possible. Those with skill in the computing arts will recognize that the disclosed embodiments have relevance to a wide variety of computing environments and architectures in addition to those described below. In addition, the methods of the disclosed technology can be implemented in software, hardware, or a combination of software and hardware. The hardware portion can be implemented using specialized logic; the software portion can be stored in a memory and executed by a suitable instruction execution system such as a microprocessor, personal computer (PC) or mainframe.

In the context of this document, a "memory" or "recording medium" can be any means that contains, stores, communicates, propagates, or transports the program and/or data for use by or in conjunction with an instruction execution system, apparatus or device. Memory and recording medium can be, but are not limited to, an electronic, magnetic, optical, electromagnetic or semiconductor system, apparatus or device. Memory and recording medium also includes, but is not limited to, for example the following: a portable computer diskette, a random access memory (RAM), a read-only memory (ROM), an erasable programmable read-only memory (EPROM or flash memory), and a portable compact disk read-only memory or another suitable medium upon which a program and/or data may be stored.

One embodiment, in accordance with the claimed subject, is directed to a programmed method for executing programming task in a non-homogeneous architecture. The term "programmed method", as used herein, is defined to mean one or more process steps that are presently performed; or, alternatively, one or more process steps that may be performed at a future point in time. The term "programmed method" anticipates three alternative forms. First, a programmed method comprises presently performed process steps. Second, a programmed method comprises a computer-readable medium embodying computer instructions, which when executed by a computer performs one or more process steps. Finally, a programmed method comprises a computer system that has been programmed by software, hardware, firmware, or any combination thereof, to perform one or more process steps. It is to be understood that the term "programmed method" is not to be construed as simultaneously having more than one alternative form, but rather is to be construed in the truest sense of an alternative form wherein, at any given point in time, only one of the plurality of alternative forms is present.

Figure 1:
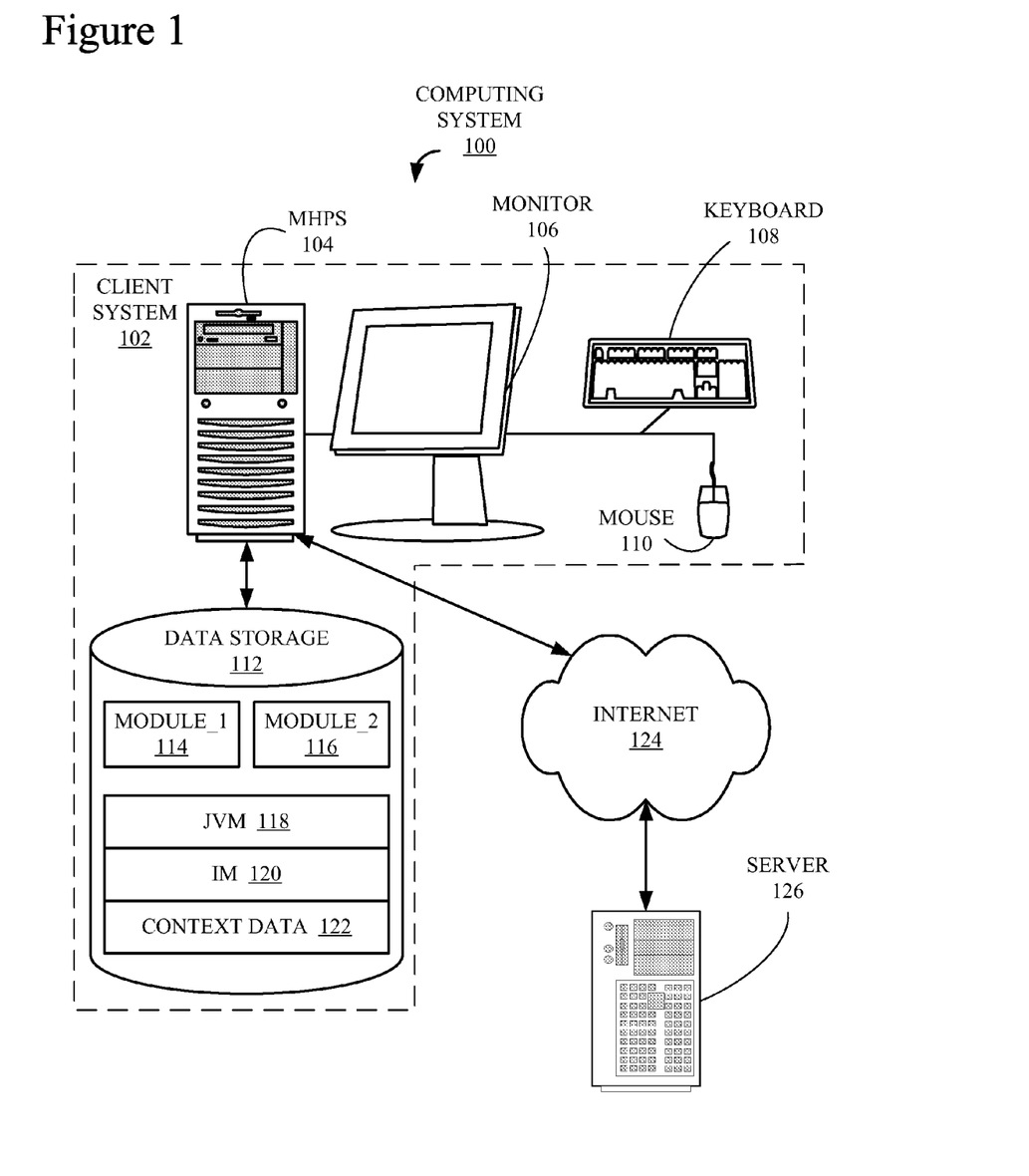
FIG. 1 is a block diagram of one example of a computing system architecture that incorporates the claimed subject matter.

Turning now to the figures, FIG. 1 is a block diagram of one example of a computing system architecture 100 that incorporates the claimed subject matter. A client system 102 includes a multi-core heterogeneous processor system (MHPS) 104, coupled to a monitor 106, a keyboard 108 and a mouse 110, which together facilitate human interaction with computing system 100 and client system 102. Also included in client system 102 and attached to MHPS 104 is a data storage component 112, which may either be incorporated into MHPS 104, i.e. an internal device, or attached externally to MHPS 104 by means of various, commonly available connection devices such as but not limited to, a universal serial bus (USB) port (not shown). Data storage 112 is illustrated storing two examples of computing modules, i.e. a module_1 114 and a moduole_2 116, that are executed according to the claimed subject matter. It should be noted that a typical computing system would include more than two computing modules, but for the sake of simplicity only two are shown.

Also illustrated stored on data storage 112 are a JVM 118, an intermediate module (IM) 120 and context data 122. JVM 118, IM 120 and context data 122 work together to implement the claimed subject matter and are described in more detail below in conjunction with FIGS. 2-6.

Client system 102 and MHPS 104 are connected to the Internet 124, which is also connected to a server computer 126. Although in this example, MHPS 104 and server 126 are communicatively coupled via the Internet 124, they could also be coupled through any number of communication mediums such as, but not limited to, a local area network (LAN) (not shown). Further, it should be noted there are many possible computing system configurations, of which computing system 100 is only one simple example, that could implement the claimed subject matter.

Figure 2:
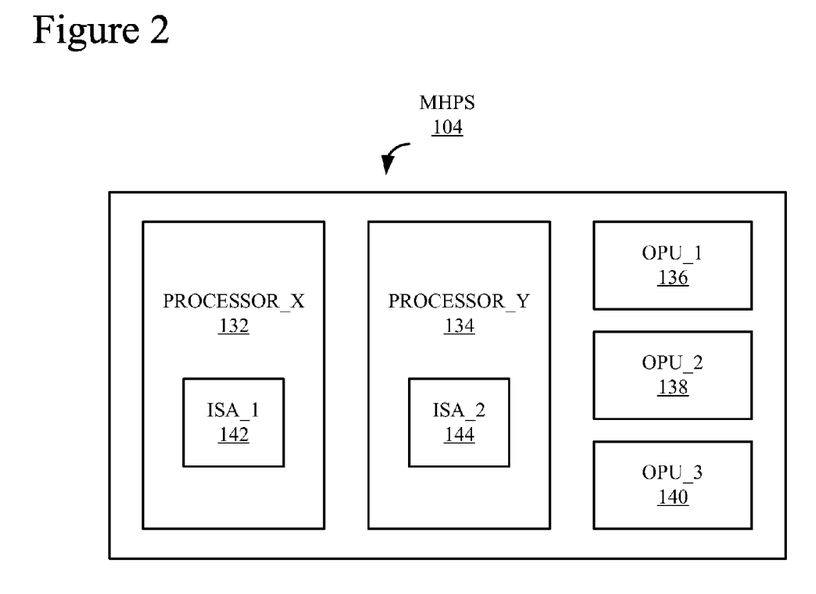
FIG. 2 is a block diagram of a multi-core heterogeneous processor system (MHPS), first introduced in FIG. 1.

FIG. 2 is a block diagram of MHPS 104, first introduced in conjunction with FIG. 1, in more detail. MHPS 104 is one simple example of a multi-core processor that executes the claimed subject matter. Those with skill in the computing arts should appreciate that other computing architectures could also implement and benefit from the claimed subject matter.

MHPS 104 includes five separate processors, or cores, i.e. a processor_X 132, a processor_Y 132, an other processing unit_1 (OPU_1) 136, an OPU_2 138 and an OPU_3 140. In this example, processor_X 132 is executing JVM 118 (FIG. 1). Throughout the following description, processor_X 132 and processor_Y 134 are employed as examples of two different processing cores that implement different Instruction Set Architectures (ISAs), an ISA_1 142 and an ISA_2 144, respectively. It should also be noted that OPU_1 136, OPU_2 138 and OPU_3 140 may be executing either the same ISA as processor_X 132 or processor_Y 134 or each may be executing different ISAs. In other words, processor_X 132 and processor_Y 134 are executing two different ISAs 142 and 144, respectively, and processors 136, 138 and 140 are each executing ISA_1 142, IDA_2 144 or different ISAs altogether. For the sake of simplicity, the claimed subject matter is described with respect to two different ISAs 142 and 144 although it should be appreciated by one with skill in the computing arts that the disclosed techniques apply equally well to a system that may be executing three or more ISAs.

Figure 3:
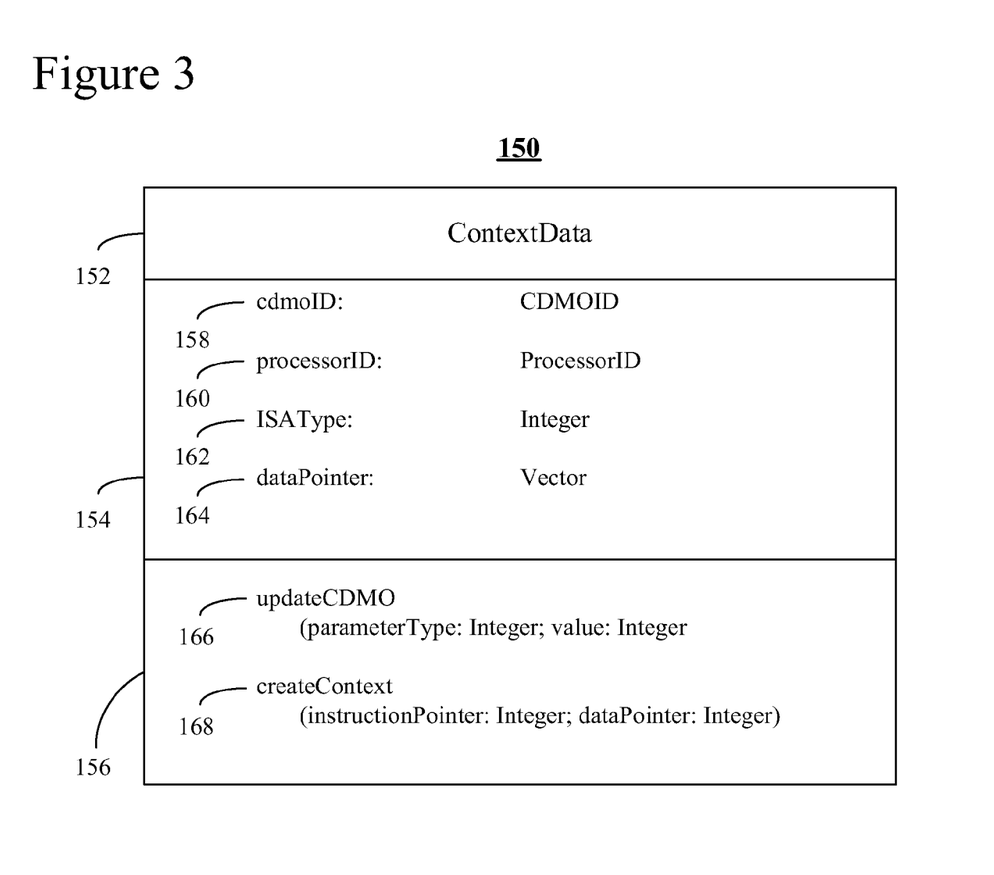
FIG. 3 is one example of a ContentData memory object (CDMO) employed to implement one embodiment of the claimed subject matter.

FIG. 3 is one example of a ContextData memory object (CDMO) 150 employed to implement one embodiment of the claimed subject matter. CDMO 150 is stored on data storage 112 (FIG. 1) of client system 102 (FIG. 1) in conjunction with context data 122 (FIG. 1). Context data 122 could include multiple instantiations of CDMO 150, each instantiation corresponding to a particular processor 134, 136, 138 or 140 (FIG. 2). In the following example, CDMO 150 corresponds to processor_Y 134, executing ISA_2 144 (FIG. 2). Typically, processor_X 132 would not need an instantiation of CDMO 150 because processor_X 132 is executing JVM 118 (FIG. 1), which is configured to execute in conjunction with ISA_1 142 (FIG. 2).

CDMO memory object 150 includes a title section 152, which merely states the name of CDMO 150, i.e. "ContextData," an attribute section 154, which contains memory elements, or attributes, associated with CDMO 150, and a method section 156, which includes functions, or methods, that may be executed in conjunction with CDMO 150. It should be noted that the attributes and methods described are used for the purpose of illustration only. Additional and/or different attributes and methods may be employed to implement the claimed subject matter.

Attribute section 152 includes an "cdmoID" attribute 158, a "processorID" attribute 160, an "ISAType" attribute 162 and a "datapointer" attribute 164. CdmoID attribute 158 is a variable of type CDMOID that contains a reference to the particular instance of object 150. Each instance of object 150 has a unique value for attribute 158 that allows each instance to be uniquely identified. ProcessorID attribute 160 is a variable of type ProcessorID that stores a reference to a particular processor associated with a particular instantiation of object 150 and in this case MHPS 104 (FIG. 1). In other words in this example, attribute 160 identifies a particular processor of MHPS 104 such as processor_Y 134, OPU_1 136, OPU_2 138 or OPU_3 140.

ISAType attribute 162 is a variable of type Integer that stores a code for identifying a specific ISA associated with the processor identified by processorID attribute 160. As explained above in conjunction with FIG. 2, each processor 132, 134, 136, 138 and 140 has a particular ISA and each ISA may be different or the same as the ISA of another processor. DataPointer attribute 164 is a variable of type Integer that stores a memory location corresponding to the data necessary for implementing a particular instruction according to the disclosed technology. Specifically, attribute 164 identifies a portion of memory 112 (FIG. 1) that stores data necessary for a particular instruction to execute. In the alternative, necessary data is passed to a processor in conjunction with an instruction rather than stored in memory 112 and passed via a pointer. Attributes 158, 160, 162 and 164 are employed by an Execute Code process 230 (see FIG. 5) and a Run Native Code process 260 (see FIG. 6) to implement the claimed subject matter and are described in more detail below.

Method section 156 of CDMO 150 includes two exemplary functions, or methods. Only two methods are illustrated for the sake of simplicity. Those with skill in the programming arts should appreciate that an object such as CDMO 150 would typically include many additional methods including, but not limited to, constructors, destructors, and methods to set and get values for various attributes.

An "updateCDMO" method 166 is called when a user or application is updating one of attributes 158, 160, 162 or 164. Method 166 is called with two parameters, a "paramterType" parameter of type Integer that identifies the specific attribute being updated and a "value" parameter that specifies a new value for the particular parameter identified by the parameter-Type parameter. A "createContext" method 168 is called when a native instruction is detected. (see FIGS. 5 and 6). Methods 166 and 168 are described in more detail below in conjunction with FIGS. 4-6.

It should be understood that CDMO 150 is only one example of a memory object that may be used to implement the claimed subject matter. Other memory objects with fewer, more and/or different attributes and methods may be employed. In addition, there are many ways other than employing CDMO 150 to implement the functionality and data storage of the claimed subject matter. For example, the claimed subject matter may be implemented by means of a computer program in conjunction with a relational database.

Figure 4:
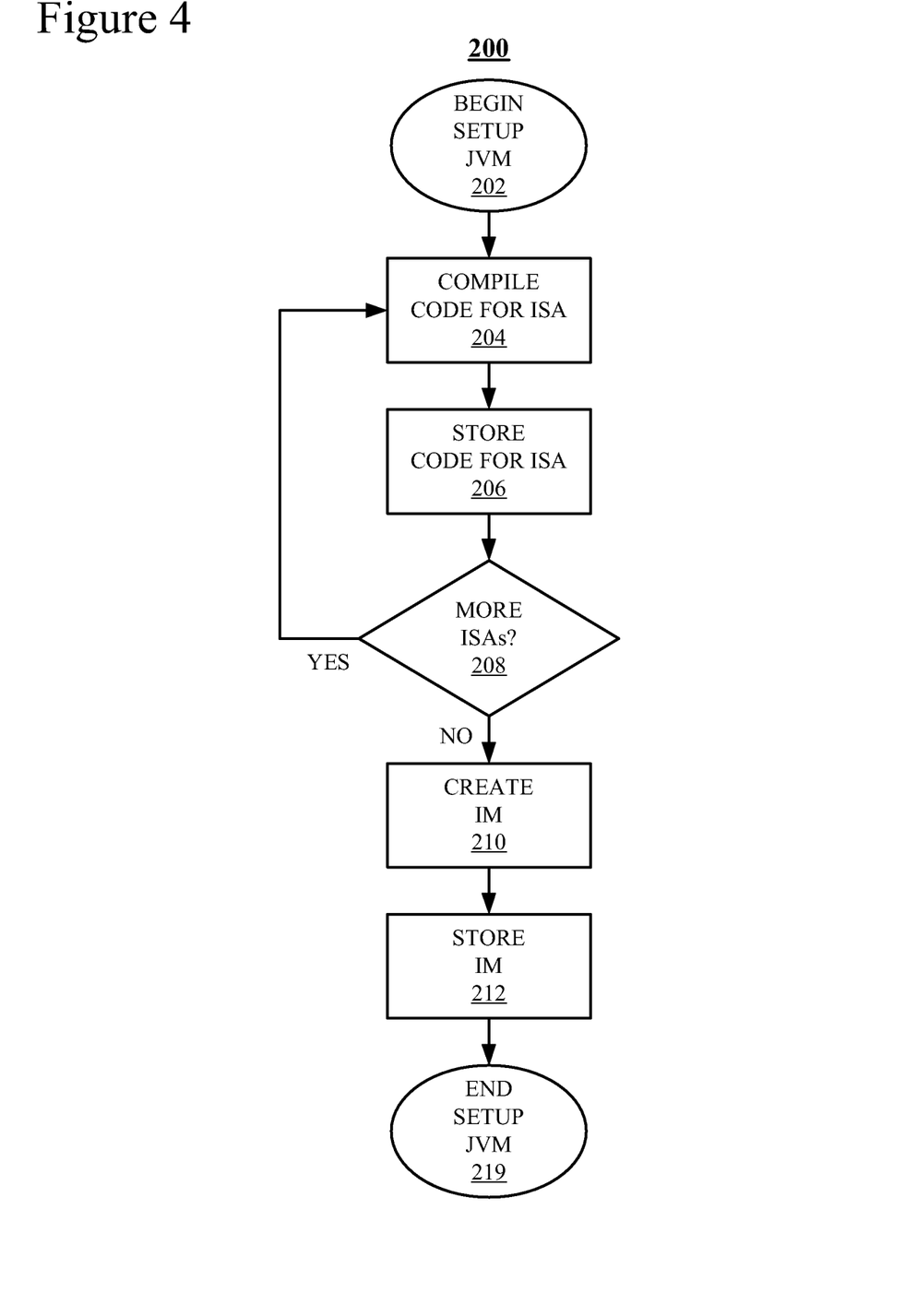
FIG. 4 is a flowchart of a Setup JAVA® Virtual Machine (JVM) process that implements one aspect of the claimed subject matter.

FIG. 4 is a flowchart of a Setup JAVA® Virtual Machine (JVM) process 200 that implements one aspect of the claimed subject matter. In this example, process 200 is stored in data storage 112 (FIG. 1) and executed on processor_X 132 (FIG. 2). Process 200 starts in a "Begin Setup JVM" block 202 and proceeds immediately to a "Compile Code for ISA" block 204.

The first time through block 204, process 200 compiles the code to instantiate JVM 118 (FIG. 1) in accordance with ISA_1 142 (FIG. 2). In other words, JVM 118 is compiled for execution on processor_X 132. During a "Store Code for ISA" block 206 JVM 118, which is compiled during block 204 is stored in data storage 112, in internal memory (not shown) associated with processor_X 132 or in some combination of the two memory locations.

During a "More ISAs?" block 208, process 200 determines whether or not MPHS 104 (FIGS. 1 and 2) contains additional processors that execute ISAs different than either ISA_1 142 or any ISA that has already been processed during an iteration through blocks 204 and 206. For example, the first time through block 208, although code corresponding to JVM 118 and ISA_1 142 has been compiled during block 204 and stored during block 206, native code corresponding to ISA_2 144 (FIG. 2) has not been compiled. Accordingly, process 200 returns to block 204 during which native code corresponding to ISA_2 144 is compiled then to block 206 during which the compiled code is stored. During the next iteration through block 208, either all ISAs in system 100 have been processed or additional ISAs remain, such as any ISAs associated with OPU_1 136, OPU_2 138 or OPU_3 140, which may be different then both ISA_1 142 and ISA_2 144. If all ISAs have not been processed through blocks 204, 206 and 208, process 200 proceeds from block 208 to block 204 and processing continues as described above. If, during block 208, process 200 determines that all ISAs have been processed, control proceeds to a "Create Intermediate Module (IM)" block 210.

During block 210, process 200 retrieves all native code corresponding to ISAs other than ISA_1 142 from the memory in which it was stored during block 206 and creates intermediate module 120 (FIG. 1). The functionality associated with IM 120 is described in more detail below in conjunction with FIGS. 5 and 6. Once process 200 has created IM 120 during block 210, control proceeds to a "Store IM" block 212 during which IM 120 is stored in memory, either data storage 112 or internal memory of processor_X 132. Finally, process 200 proceeds to an "End Setup JVM" block 219 in which process 200 is complete.

Figure 5:
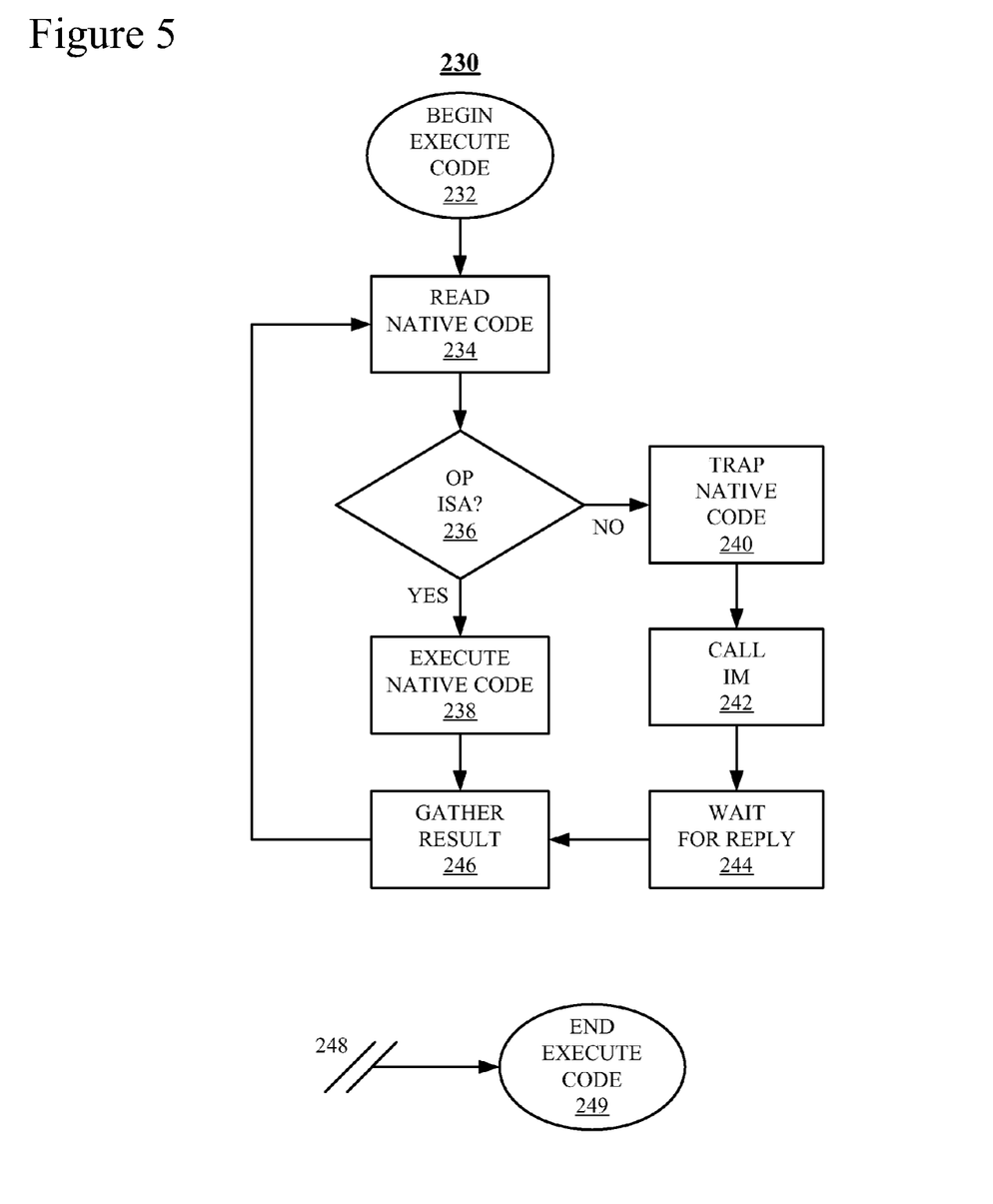
FIG. 5 is a flowchart of a Execute Code process that implements one aspect of the claimed subject matter.

FIG. 5 is a flowchart of an Execute Code process 230 that implements one aspect of the claimed subject matter. In this example, process 230 is stored in data storage 112 (FIG. 1) and executed on processor_X 132 (FIG. 2) in conjunction with JVM 118 (FIG. 1). Typically, process 230 is initiated when client system 102 (FIG. 1) is turned on and operates until client system 102 is shut down.

Process 230 starts in a "Begin Execute Code" block 232 and proceeds immediately to a "Read Native Code" block 234. During block 234, a native code portion from a program module such as module_1 114 (FIG. 1) or module_2 116 (FIG. 1), which has been initiated to run on JVM 118, is read by JVM 118. During a "Originating Processor (OP) ISA?" block 236, process 230 determines whether or not the native code read by JVM 118 during block 234 is native code corresponding to ISA_1 142, i.e. code intended to execute on processor_X 132. If so, process 230 proceeds to an "Execute Native Code" block 238 during which the native code read during block 234 is processed by processor_X 132 in a typical fashion.

If, during block 236, process 230 determines the native code read during block 234 is native code corresponding to an ISA other than ISA_1 142, process 230 proceeds to a "Trap Native Code" block 240. During block 240, the native code is removed from the standard execution path associated with processor_X 132 and, during a "Call Intermediate Module (IM)" block 242, is instead passed to IM 120 (FIG. 1). Processing associated with the call to IM 120 is described in more detail below in conjunction with FIG. 6. During a "Wait for Reply" block 244, process 230 waits for a result to be transmitted from IM 120. Once a result has been received during block 244 or native code has been executed during block 238, process 230 proceeds to a "Gather Result" block 246 during which process 230 takes the result received during block 244 or produced during block 238 and correlates the result with the results of other earlier processed native codes. Once results have been gathered, process 230 returns to Read Native Code block 234 and processing continues on the next section of the module being executed as described above.

As explained above, process 230 typically executes as long as JVM 118 is operating, either processing a particular portion of native code or waiting to receive native code. If process 230 needs to be terminated, an asynchronous interrupt 248 is generated and process 230 proceeds to an "End Execute Code" block 249 in which process 230 is complete.

Figure 6:
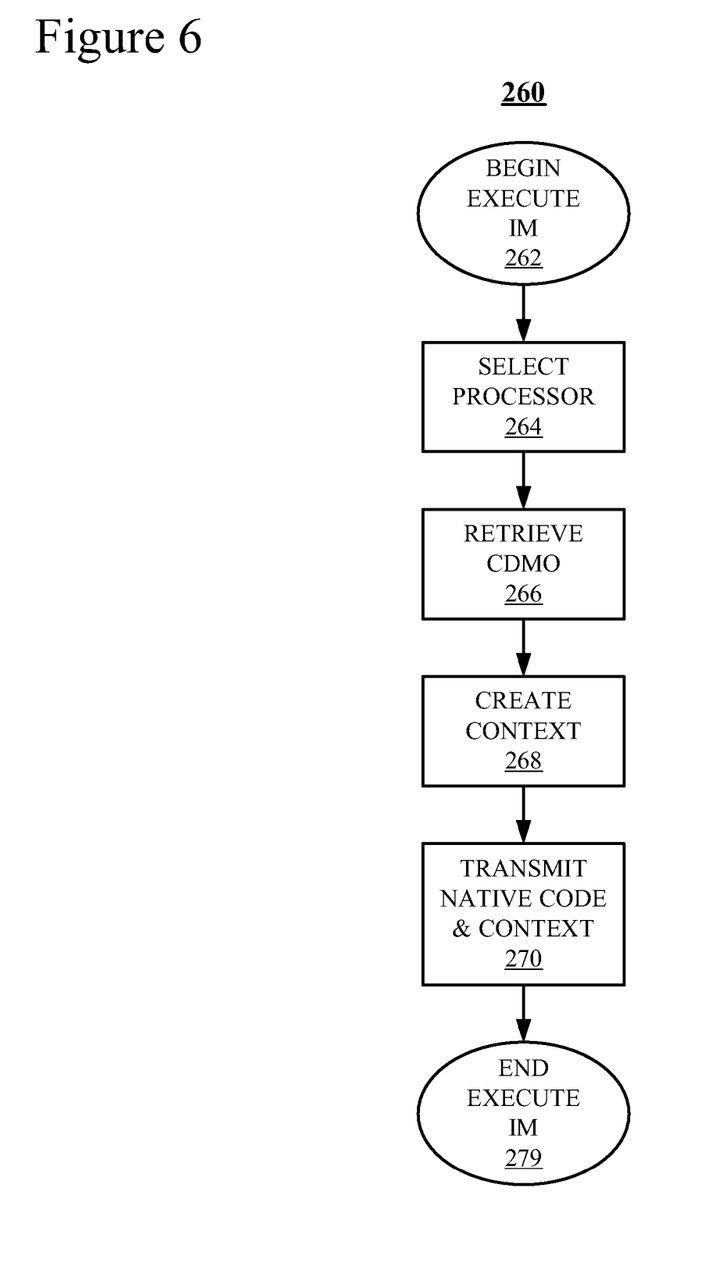
FIG. 6 is a flowchart of an Execute Intermediate Module (IM) process that describes in detail one aspect of Execute Code process of FIG. 5.

FIG. 6 is a flowchart of an Execute Intermediate Module (IM) process 260 that describes in detail one aspect of Execute Code process 230 of FIG. 5. Specifically, process 260 corresponds to Call IM block 242 of Execute Code process 230, both described above in conjunction with FIG. 5.

Process 260 starts in a "Begin Execute IM" block 262 and proceeds immediately to a "Select Processor" block 264. During block 264, process 260 determines a specific processor that corresponds to the native code detected during OP ISA? block 236 (FIG. 5) of process 230. Throughout the following description, processof_Y 134 (FIG. 2), which runs ISA_2 144 (FIG. 2), is used as the specific processor identified during block 264. Once processor_Y 134 has been identified, process 260 proceeds to a "Retrieve CDMO" block 266 during which a CDMO 150 (FIG. 3) corresponding to processor_Y 134 is retrieved from data storage 112 (FIG. 1).

Based upon the ISA corresponding to processor_Y 132, i.e. ISA_2 144, during a "Create Context" block 268, process 260 calls CreateContext method 168 (FIG. 3) to create the proper context to execute the received native code on processor_Y 134. Typically, a context includes an instruction formatted for particular ISA and any data necessary to execute the instruction. During a "Transmit Native Code and Context" block 270, both the native code and the properly formatted context created during block 268 are transmitted to processor_Y 134 for execution. In the alternative, the properly formatted native code and a data pointer that identifies a portion of memory 112 in context data 122 (FIG. 1) are transmitted. Finally, during an "End Execute IM" block 279, process 260 is complete.

While the claimed subject matter has been shown and described with reference to particular embodiments thereof, it will be understood by those skilled in the art that the foregoing and other changes in form and detail may be made therein without departing from the spirit and scope of the claimed subject matter, including but not limited to additional, less or modified elements and/or additional, less or modified blocks performed in the same or a different order.

We claim:

1. A method, executed in a multi-processing environment, comprising:
   identifying a first native code portion of a program interpreted by an interpretive engine executing on an originating processor, wherein the originating processor executes a first instruction set architecture (ISA), the first native code portion configured to execute on a target processor that executes a second ISA, and the second ISA is a different type than the first ISA, wherein the target processor and the originating processor are different processing cores as part of the multi-processing system;
   trapping a call to the first native code portion;
   creating a context in conjunction with the trapping corresponding to the second ISA for the first native code portion, wherein the context is data necessary for execution of the first native code portion;
   making the context and the first native code portion available to the target processor;
   executing the first native code portion on the target processor using the context;
   returning a result of the execution of the first native code portion to the originating processor; and
   executing a second native code portion of the program on the originating processor.

2. The method of claim 1, the making the context and first native code portion available comprising transmitting the context and the first native code portion to the target processor.

3. The method of claim 1, the making the context and first native code portion available comprising:
   storing the context and the first native code portion in a memory coupled to the target processor;
   signaling the target processor of the storing; and
   retrieving the context and the first native code portion from the memory by the target processor.

4. The method of claim 1, wherein the interpretive engine is a JAVA® virtual machine (JVM).

5. The method of claim 1, wherein the created context includes data necessary for the target processor to execute the first native code portion, the data formatted to meet requirements of the second ISA and the target processor.

6. The method of claim 1, the returning the result of the execution of the first native code portion to the originating processor comprising transmitting the result to the originating processor.

7. The method of claim 1, the returning the result of the execution of the first native code portion to the originating processor comprising:
   storing the result in a memory coupled to the originating processor; and
   signaling the originating processor that the result is stored.

8. A system, including a multi-processing system, comprising:
   an originating processor executing a first instruction set architecture (ISA) in conjunction with an interpretive engine;
   a target processor executing a second ISA that is a different type of ISA than the first ISA, wherein the target processor and the originating processor are different processing cores as part of the multi-processing system;
   executing a first native code portion of a program on the originating processor; and
   logic, stored on a first memory associated with the originating processor and executed on the originating processor, for:
      identifying a second native code portion of a program being interpreted by the interpretive engine, wherein the second native code portion is configured to execute in conjunction with the second ISA;
      trapping a call to the second native code portion;
      generating a context in conjunction with the trapping corresponding to the target processor for the second native code portion, wherein the context is data necessary for execution of the second native code portion;
      transmitting the second native code portion and the context available to the target processor;
      transmitting a signal to the target processor to initiate execution of the second native code portion using the context; and
      receiving, at the originating processor, a result of the execution of the second native code portion on the target processor.

9. The system of claim 8, the logic for making the first native code portion and the context available comprising logic for transmitting the first native code portion and the context to the target processor.

10. The system of claim 8, the logic for making the context available comprising logic for:
    storing the context in a memory coupled to the target processor;
    signaling the target processor of a storing; and
    retrieving the context from the memory by the target processor.

11. The system of claim 8, wherein the interpretive engine is a JAVA® virtual machine (JVM).

12. The system of claim 8, wherein the created context comprises data necessary for the target processor to execute the first native code portion, the data formatted to meet requirements of the target processor and the second ISA.

13. The system of claim 8, the logic for returning the result of the execution of the first native code to the interpretive engine comprising logic for transmitting the result to the originating processor.

14. The system of claim 8, the logic for returning the result of the execution of the first native code to the interpretive engine comprising logic for:
    storing the result to a memory coupled to the originating processor; and
    signaling the originating processor that the result is stored.

15. A computer programming product for assigning computing tasks in a non-homogeneous, multi-processor environment, comprising:
    a memory; and
    logic, stored on the memory for execution on a originating processor, wherein the originating processor executes a first instruction set architecture (ISA), for:
        executing a first native code portion of a program on the originating processor;
        identifying a second native code portion of a program being interpreted by an interpretive engine executing on the originating processor;
        trapping a call to the second native code portion, wherein the second native code portion is configured to execute on a target processor executing a second ISA, wherein the second ISA is a different type than the first ISA, wherein the target processor and the originating processor are different processing cores as part of the multi-processing system;
        calling an intermediate function in conjunction with the trapping to create a context for the second native code portion on the target processor, wherein the context is data necessary for execution of the second native code portion;
        making the second native code portion and the context available to the target processor;
        signaling the target processor to execute the second native code portion using the context; and
        returning the result of the execution of the second native code portion to the originating processor.

16. The computer programming product of claim 15, the logic for making the context available comprising logic for transmitting the second native code portion and the context to a computing system associated with the target processor.

17. The computer programming product of claim 15, the logic for making the context available comprising logic for:
    storing the second native code portion and the context in a memory coupled to the target processor;
    signaling the target processor that the second native code portion and the context have been stored; and
    retrieving the context from the memory coupled to the target processor by the target processor.

18. The computer programming product of claim 15, wherein the created context comprises data necessary for the target processor to execute the second native code, the data formatted to meet requirements of the target processor and the second ISA.

19. The computer programming product of claim 5, the logic for returning the result of the execution of the second native code to the originating processor comprising logic for transmitting the result to the originating processor.

20. The computer programming product of claim 15, the logic for returning the result of the execution of the second native code to the originating processor comprising logic for:
    saving the result to a memory coupled to the originating processor; and
    signaling the originating processor that the result is available.

* * * * *